Nov. 20, 1956  H. P. SMITH ET AL  2,771,326
BEARING
Filed April 29, 1954
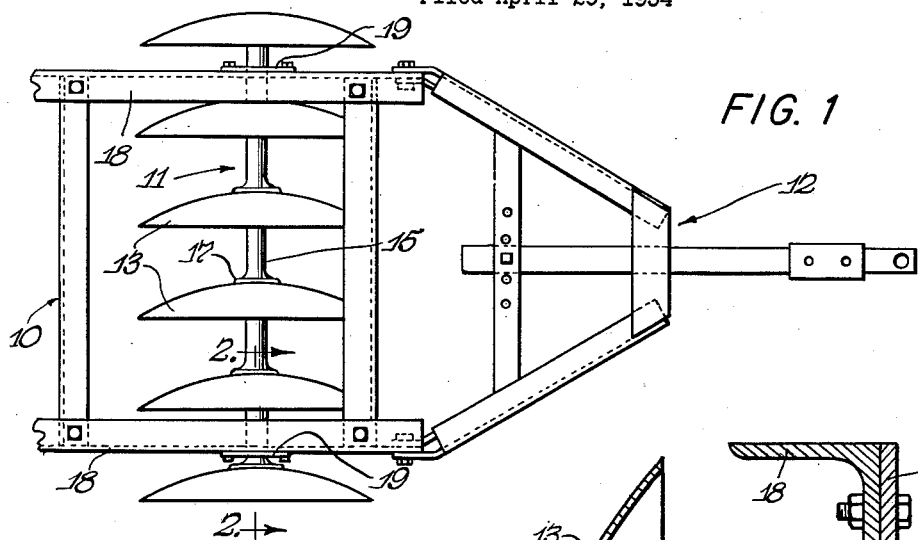
FIG. 1
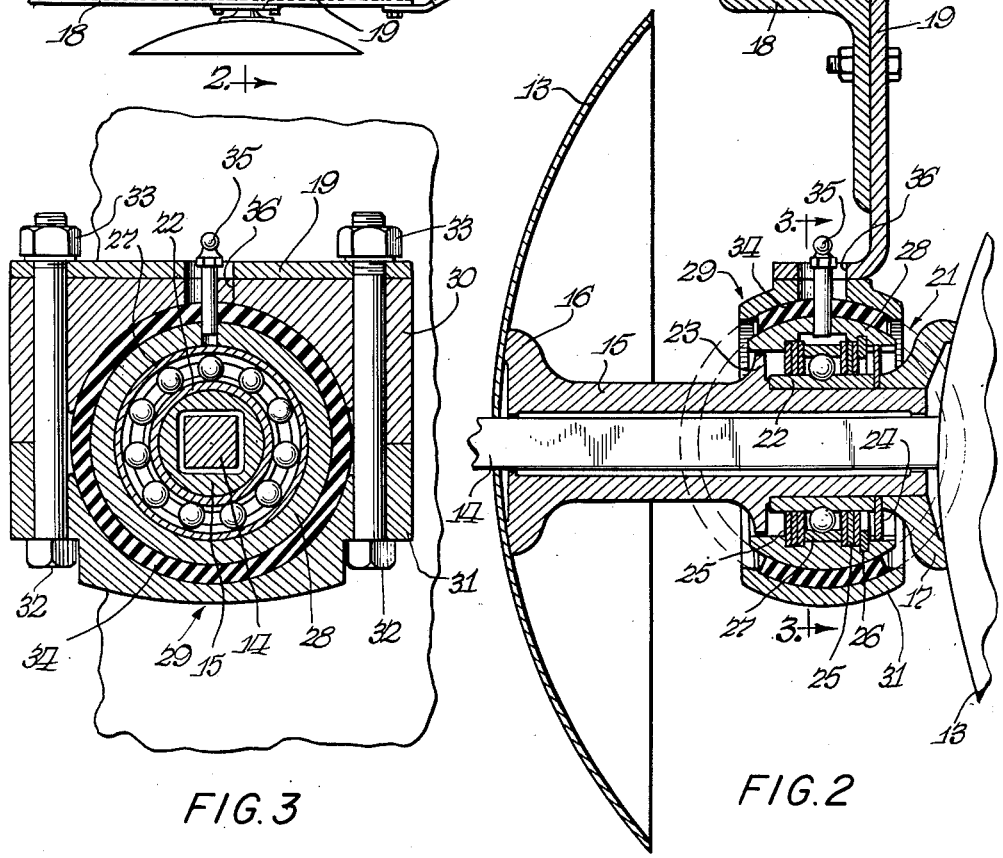
FIG. 3
FIG. 2
INVENTOR
HIRAM PAUL SMITH
RICHARD W. KRAMER
Paul O. Pippel
ATTORNEY

United States Patent Office 2,771,326
Patented Nov. 20, 1956

2,771,326

BEARING

Hiram P. Smith, Stockton, and Richard W. Kramer, Modesto, Calif., assignors to International Harvester Company, a corporation of New Jersey Application April 29, 1954, Serial No. 426,405

1 Claim. (Cl. 308—181)

This invention relates to agricultural implements, and has particular reference to an implement such as a disk harrow wherein a gang of disks is rotatably supported from a carrying frame. More specifically, the invention concerns a novel bearing construction by which the tool gang is rotatably supported and by which limited angular movement of the gang is accommodated.

The bearing with which this invention is concerned is particularly adaptable to disk harrows, wherein a plurality of aligned disks mounted on a common axis are propelled over the ground at an angle to the direction of travel. In such an implement, relative movement between the parts is usually accommodated by looseness of parts and the amount of play therebetween. In previous crude constructions it has been difficult to prevent dirt and debris from getting into the bearing parts and interfering with the operation of the implement. Likewise, the relative angular movement between the gang and its carrying frame has subjected the bearing parts to considerable wear, shortening the life of the implement. An object of the present invention is the provision of an improved precision mounting by which a gang of disks is connected to a carrying frame.

Another object of the invention is the provision in a disk harrow, wherein a gang of disks is rotatably mounted in a housing carried by the frame, of improved bearing means supporting the harrow gang for rotation, and accommodating relative angular movement between the parts without subjecting them to excessive wear or exposing the parts to contamination by dirt and debris.

Another object of the invention is the provision of an improved mounting for a disk gang or the like, including flexible means holding the parts in place and yieldable to accommodate relative angular movement.

Other objects and advantages of the invention will become clear from the following detailed description when read in conjunction with the accompanying drawings, wherein:

Figure 1 is a plan view of a portion of a disk harrow incorporating the features of this invention;

Figure 2 is a section taken on the line 2—2 of Figure 1; and

Figure 3 is a section taken on the line 3—3 of Figure 2.

Referring to the drawings, the numeral 10 designates generally the supporting frame for a disk gang 11, propelled over the ground by a tractor or other source of power to which the implement is connected by a draft structure 12.

The harrow gang 11 comprises a plurality of disks 13 mounted upon a transverse shaft 14, square in section, and spaced shaft-like members in the form of spools 15. For easy assembling, each of the spools 15 is provided with a flange 16 at one end thereof engageable with the inner concave face of the adjacent disk 13. A flange 17 is fitted on the other end of the spool for engagement with the outer convex surface of the adjacent disk 13. Laterally spaced angle bars 18 form a part of the frame 10 of the harrow and hangers 19 are secured thereto to support the disk gang 11, as will hereinafter appear.

The spool 15 adjacent the hanger 19 has mounted thereon a bearing structure generally indicated at 21, of the anti-friction type having an inner race 22 fixed on the spool for rotation therewith between an annular shoulder 23 on the spool and a washer 24 between the race 22 and the flange 17. Sealing rings 25 are provided and a snap ring 26 holds the parts in place upon assembly.

The outer race 27 of the bearing structure has mounted thereon a metal annulus or sealing ring 28 having a convex outer periphery curved in an arc forming a part of a sphere described about the axial center of the bearing, as indicated in dotted lines in Figure 2. The bearing structure is received within a housing 29 in the form of a clamp having adjustable upper and lower parts 30 and 31, respectively, held together by bolts 32 threaded at their ends to receive nuts 33. These bolts also serve for suspending the housing 29 from the hanger 19, as shown in Figure 3.

There is sufficient spacing between the clamp structure 29 and the bearing structure 21 to accommodate relative angular movement between the gang 11 and frame 10 of the harrow. The parts are resiliently held in place and the relative movement accommodated by the provision of a cylindrical tube 34 of resilient material, preferably of rubber, which spaces the housing 29 from the metal ring 28 and confines the rubber cylinder therebetween. The housing 29 has an inner peripheral surface concentric with the outer peripheral surface of the metal ring 28 so that upon clamping the parts 30 and 31 together, the cylinder 34 is deformed spherically to the curvature of the adjacent surfaces.

Grease may be supplied to the bearing through a fitting 35 extending through an opening 36 in the hanger 19 and upper clamp part 30 and through a suitable opening in the rubber cylinder 34 into the metal ring 28, whereby grease can be injected into the spaces about the bearing structure. Dirt is thus inhibited by the presence of grease from entrance into the bearing, and any dirt which has gained entrance is forced out by the injection of fresh grease.

From the foregoing it will be observed that a novel mounting for the gangs of disk harrows and the like has been provided. It should likewise be understood that the invention has been described in its preferred embodiment only, and that modifications may be made therein without departing from the spirit of the invention or the scope of the appended claim.

What is claimed is:

In a mounting for harrow gangs and the like wherein a disk-carrying spool is rotatably mounted on a supporting frame, an anti-friction bearing having an inner race surrounding the spool and mounted thereon for rotation therewith and an outer race, a metal sealing ring mounted on the outer race of said bearing having an arcuate outer periphery forming part of a sphere having its center on the axis of said bearing, a housing surrounding said metal sealing ring having an arcuate inner surface spaced from and concentric with the outer surface of the metal ring, a cylindrical rubber sleeve of uniform diameter compressed between the ring and the housing and conforming to the shape thereof, and means for securing the housing to the frame.

References Cited in the file of this patent

UNITED STATES PATENTS 2,138,659    Kindig  ------------------  Nov. 29, 1938
2,439,267    Shafer  ------------------  Apr. 6, 1948